Aug. 1, 1967     A. ALVAREZ-CALDERON     3,333,792

ACTUATOR FOR VARIABLE SPAN WING

Filed Dec. 9, 1965

INVENTOR
ALBERTO ALVAREZ-CALDERON

United States Patent Office 3,333,792
Patented Aug. 1, 1967

3,333,792
ACTUATOR FOR VARIABLE SPAN WING
Alberto Alvarez-Calderon, Av. Salaverry 3465,
Orrantia del Mar, Lima, Peru
Filed Dec. 9, 1965, Ser. No. 512,617
11 Claims. (Cl. 244—43)

This invention relates to variable span wings for aircraft. It is a continuation-in-part application of my pending patent application 358,022 of Apr. 7, 1964, now abandoned, and it relates to my issued U.S. Patent 3,139,248.

The aerodynamic, structural, mechanical and operational characteristics of variable span wings are described in the above mentioned patent application and issued patent; they will not be repeated here.

One purpose of this invention is to provide simple mechanical means to provide angular motion of the panels of my variable span wings by an angle greater than 90° and of the order of 180°.

Another purpose of the invention is to provide a bellcrank-link-push rod system to produce angular motion of my folding panel.

These and other objects of my invention are described in the specification, and in the drawings, in which FIG. 1 shows my actuator mechanism with the folding panel of the variable span wing extended.

Figure 1:
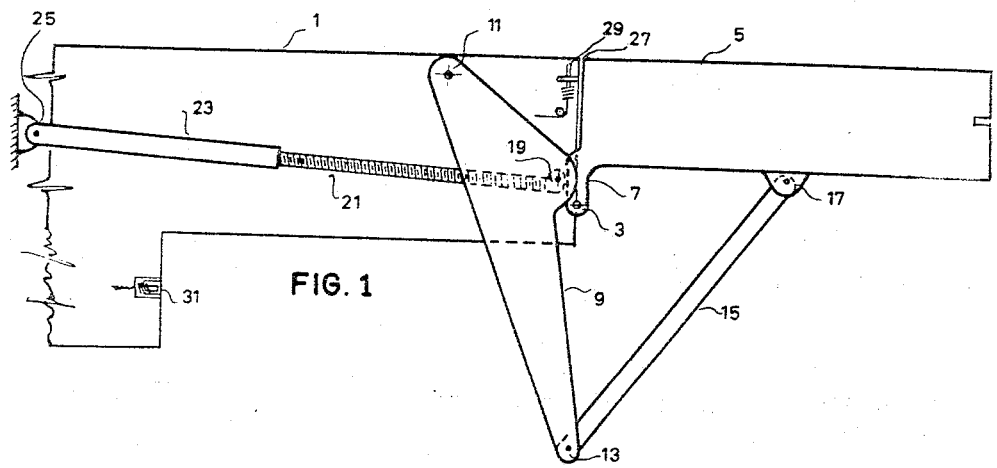

Specifically, FIG. 1 shows a principal wing panel 1 supporting at folding axis 3 an extended span increasing panel 5 by means of panel bracket 7.

The actuator mechanism comprises a bellcrank 9 connected to the wing at hinge axis 11 adjacent to the wing's upper surface. Bellcrank 9 is commanded at connection 19 below hinge axis 11 by jackscrew 21-23 which is supported to the principal wing panel at 25. Bellcrank 9 is connected to panel 17 through link 15 hinged at joints 13 and 17 on the bellcrank and folding panel respectively.

In FIG. 1 the folding panel can be fixed immobile extended either by joint 3 and compressive contact to principal panel at 27, or by hinge 3 and tension in link 15. The former method is preferable in flight at a fixed extended position. During retraction the panel should preferably be unloaded by a trailing edge flap on the folding panel as described in my application 358,022. The panel is folded by tension in arm 15 for small positive loads on the panel, or with compression in arm 15 for small negative loads on the panel.

Evidently the bellcrank motion is obtained by axial shortening of jackscrew 23-21 at the pilot's command. This can be designed by anyone skilled in the art, with an electric motor or a hydraulic system. The bellcrank describes path 27 shown in FIG. 2 to final retracted position of that figure in which joint 13 is adjacent the upper surface of the wing and bellcrank 9 and link 15 inside the wing's contour.

It is seen that by small angular displacement 27 of bellcrank, of the order of 110°, a larger 180° displacement of the folding panel is obtained with small axial displacement of the jackscrew.

Figure 2:
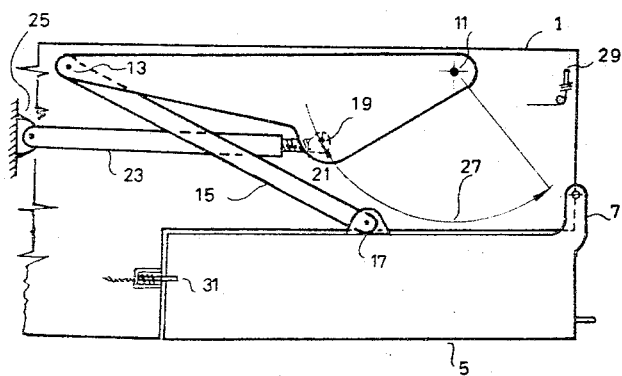
FIG. 2 shows my actuator mechanism with the panels folded.

FIG. 1 and 2 also show locking devices to unload actuator in the extended panel position. Specifically, in FIG. 1 locking pin 29 is engaging the extended panel in the extended position and unloading the actuator, while locking pin 31 is retracted and inoperative. In FIG. 2, locking pin 29 is retracted and inoperative, and locking pin 31 is engaged to the folded panel to unload actuator from any negative wing pressures as for example, in a negative gust.

In my actuator, the portion of the bellcrank which protrudes below the wing in the panel-extended position, and link 15, can be made streamlined in cross-section to decrease drag in take-off. Also, two bellcrank systems can be used in a two-spar wing.

Figure 3:
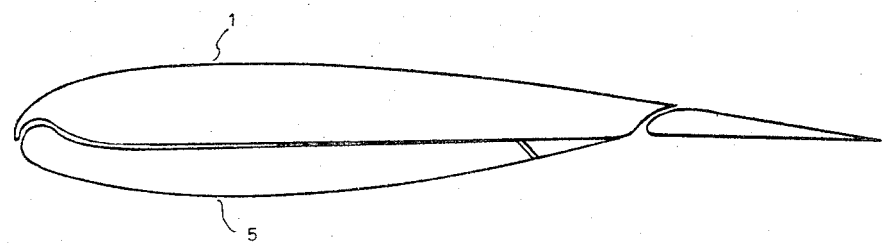
FIG. 3 shows a cross-sectional view of my variable span wing with the panel folded.

FIG. 3 shows a cross-section of my folded panel and of the primary panel, showing the highly cambered cross-section of each component and a combined uncambered cross-section.

Variation on my drawings can be made without departing from the spirit of my invention.

What I claim is:

1. A primary wing panel having an approximately chordwise outboard edge portion, a folding panel directly mounted on said primary panel at an articulation adjacent and approximately parallel to said chordwised edge portion, said folding panel being adapted to be moved in flight from a folded position of reduced span and skin area exposed to the airstream in which said folded panel is contiguous, substantially parallel, and mated to said primary panel and inboard of said articulation to an extended position of increased skin area exposed to the airstream outboard of said articulation, and in which said folding panel extends the span of said primary panel; actuating means to move and support said folding panel for any folding panel position in flight comprising: first link means pivotally mounted on said primary panel at a hinge axis adjacent the upper surface of said primary panel remote from said articulation with said hinge axis being approximately parallel to said articulation; means for moving said link means, said moving means being mounted on said wing inboard of said hinge axis and connected to said first link means eccentric to below said hinge axis; and second link means connecting a portion of said first link means to a portion of said folding panel located external to said articulation.

2. The structure of claim 1 further characterized in that said articulation is adjacent to a lower surface of said primary panel and said folding panel in said folded position is below and immediately adjacent to said primary panel.

3. The structure of claim 1 further characterized in that said folding panel is adapted to have a movable trailing portion which aerodynamically unloads said folding panel during panel motion.

4. The structure of claim 1 further characterized in that locking means are provided to secure said folding panels in flight to said primary panel in said folded position.

5. The structure of claim 1 further characterized in that means are provided between said folding panels and primary panels which unlock said folding panels in flight.

6. The structure of claim 1 further characterized in that for any folding panel position, the lines connecting said hinge axis, said mounting location of said means for moving said first link means, and the locus of said connection of said moving means to said first link means, define a triangle.

7. The structure of claim 1 further characterized in that for any folding panel position, the lines connecting the locus of said articulation, said mounting location of said moving means, and the locus of the connection between said second link means and said folding panel, define a triangle.

8. The structure of claim 1 further characterized in that said link means comprise bellcrank means and in that said second link means are connected to an end of said bellcrank opposite to said hinge axis.

9. The structure of claim 7 further characterized in that said means for moving said first link means comprise axially extending means connected to said bellcrank between said hinge axis and said end of said bellcrank.

10. A folding wing system comprising:
a primary wing panel;
a folding wing panel hinged at a first hinge axis to said primary panel;
first link means connected to said primary panel at a second hinge axis external to said first hinge axis;
second link means connected to said primary panel at a third hinge axis inboard of said first hinge axis, and to said first link means at a fourth hinge axis external from said second hinge axis;
third link means connected to said first link means at a fifth hinge axis external to said second hinge axis and connected to said folding panel at a sixth hinge axis external to said first hinge axis;
said folding wing system being further characterized in that said first and third link means are of a fixed length and rigid, in that the lines connecting said fourth, second and third hinge axis define a triangle, and in that the lines connecting said first, fifth and sixth hinge axis define another triangle.

11. The structure of claim 10 further characterized in that said second link means is adapted to move with respect to said primary panel in order to move said folding panel, and in that said motion of said second link means produces a change in the shape of at least one of said triangles.

References Cited
UNITED STATES PATENTS

| | | | |
|---|---|---|---|
| 2,166,564 | 7/1939 | Atwood et al. | 244—49 |
| 2,289,224 | 7/1942 | Swanson et al. | 244—49 |
| 2,290,850 | 7/1942 | Umschweif | 244—49 |
| 2,538,602 | 1/1951 | Taylor et al. | 244—49 |
| 2,925,233 | 2/1960 | Dunn et al. | 244—43 |

MILTON BUCHLER, *Primary Examiner.*

B. BELKIN, *Assistant Examiner.*